(No Model.)
C. H. OLSON.
SCREW DRIVER.
No. 301,915. Patented July 15, 1884.
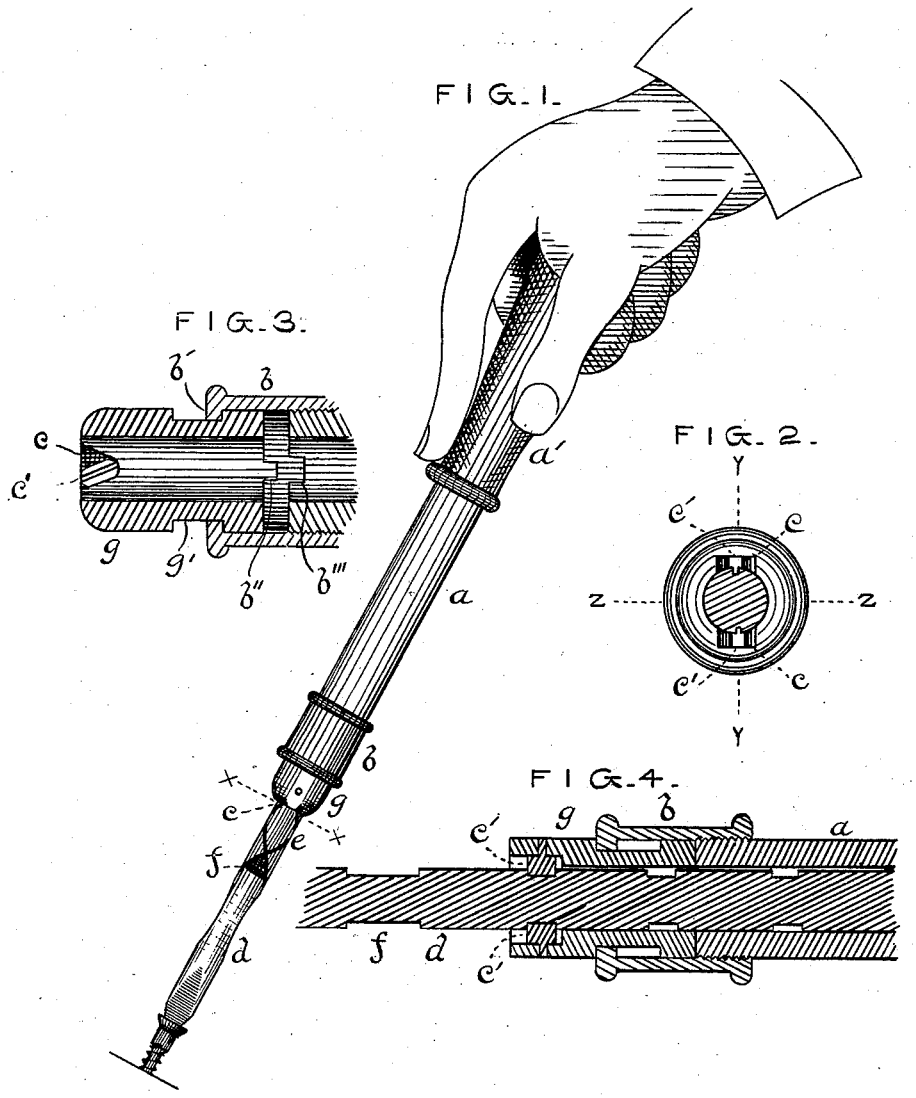

United States Patent Office.

CHRISTOPHER H. OLSON, OF DECATUR, ILLINOIS.

SCREW-DRIVER.

SPECIFICATION forming part of Letters Patent No. 301,915, dated July 15, 1884.

Application filed February 1, 1884. (No model.)

*To all whom it may concern:*

Be it known that I, CHRISTOPHER H. OLSON, a resident of the city of Decatur, county of Macon, and State of Illinois, have invented certain new and useful Improvements in Screw-Drivers, of which the following is a specification.

The object of my invention is to produce rotary motion in a screw-driver by means of helical grooves in the shaft and coacting internal projections in the cylindrical handle, the said handle operating with a reciprocating motion in the direction of its length, and the grooves in the shaft and projections in the handle being adapted to rotate the shaft in either direction at the will of the operator, thereby making it possible to either drive or draw a screw by substantially the same operation.

In the drawings accompanying and forming a part of this specification, Figure 1 shows my device in operation. Fig. 2 is a transverse section on dotted line $x\ x$, Fig. 1. Fig. 3 is a diametrical section of a portion of the handle, taken in the direction indicated by dotted line $z\ z$ in Fig. 2. Fig. 4 is a diametrical section of a portion of the handle and shaft, taken in the direction indicated by dotted line $y\ y$, Fig. 2; and Fig. 5 is a diametrical section of the handle, exposing the entire shaft.

$a$ is the cylindrical handle, provided with enlarged termination $a'$.

$b$ is a band secured to the handle and provided with inward extension, $b'$.

$g$ is a collar provided with circular indentation $g'$ and clutch projections $b''$, adapted to engage coacting recesses $b'''$ in the handle.

$d$ is the shaft, provided with two sets of helical grooves, $e$, which traverse the shaft in opposite directions and terminate in recesses of substantially the form shown at $f$.

$c$ shows cavities in the end of collar $g$, which form receptacles for pivoting projections $c'$.

As indicated in Fig. 1, the device is operated by pressure against the end of the handle, the direct motion of which is converted into rotary motion in the shaft by means of the projections in the collar and the grooves in the shaft. As the handle is redrawn preparatory to repeating the operation, the clutch projections $b''$ become disengaged from recesses $b'''$, (see Fig. 3,) thus permitting the collar to rotate in the handle without affecting the shaft. To reverse the motion of the shaft the pivoting projections are forced into recesses $f$, where a partial rotation of the handle with relation to the shaft will carry the said projections against the opposing side of the recess, and into the proper position to engage the opposite pair of grooves.

The cavities $c$ are so constructed that the projections $c'$ may pivot freely from side to side of the recesses $f$, and still receive lateral support from the sides of said cavities when in actual operation.

I am aware that a screw-driver shaft provided with helical grooves has been described in patent to Allard, No. 157,408, November 24, 1874, and that in Patents No. 284,799, granted to Barber September 11, 1883, No. 281,068, granted to Hoague July 10, 1883, and No. 240,223, granted to Belcher April 19, 1881, helical grooves are shown traversing the shaft in opposite directions.

I am also aware that in the above-mentioned patents rotary motion in the shaft is produced by reciprocating motion of the hand longitudinally on the shaft; and therefore I do not claim, broadly, the double opposing set of helical grooves in combination with the reciprocating handle.

I claim as new and desire to secure by Letters Patent—

The combination, in a screw-driver, of cylindrical handle $a$, provided with recesses $b'''$, band $b$, provided with inward extension, $b'$, drive-collar $g$, provided with circular indentation $g'$ and clutch projections $b''$, shaft $d$, provided with intersecting helical grooves $e$ and angular recesses $f$, and pivoting projections $c'$ in recesses $c$, as and for the purpose set forth.

CHRISTOPHER H. OLSON.

Attest:
P. D. WALKER,
C. H. WALTERS.